(12) United States Patent
Kaneko et al.

(10) Patent No.: US 10,960,861 B2
(45) Date of Patent: Mar. 30, 2021

(54) ELECTRONIC CONTROL DEVICE

(71) Applicant: HITACHI AUTOMOTIVE SYSTEMS, LTD., Hitachinaka (JP)

(72) Inventors: Susumu Kaneko, Isesaki (JP); Takeshi Iizuka, Isesaki (JP); Kazuaki Nagashima, Isesaki (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 132 days.

(21) Appl. No.: 16/079,478

(22) PCT Filed: Jan. 26, 2017

(86) PCT No.: PCT/JP2017/002722
§ 371 (c)(1),
(2) Date: Aug. 23, 2018

(87) PCT Pub. No.: WO2017/159061
PCT Pub. Date: Sep. 21, 2017

(65) Prior Publication Data
US 2019/0061714 A1    Feb. 28, 2019

(30) Foreign Application Priority Data
Mar. 14, 2016  (JP) ................................. 2016-049376

(51) Int. Cl.
*B60T 8/17*       (2006.01)
*B60T 8/34*       (2006.01)
(Continued)

(52) U.S. Cl.
CPC ............... *B60T 8/173* (2013.01); *B60T 8/34* (2013.01); *B60T 8/176* (2013.01); *B60T 2270/10* (2013.01)

(58) Field of Classification Search
CPC . B60T 8/173; B60T 8/176; B60T 8/34; B60T 2270/10
See application file for complete search history.

(56) References Cited

U.S. PATENT DOCUMENTS 4,985,845 A * 1/1991 Gotz .................... H05K 7/1432
361/679.4
5,275,478 A * 1/1994 Schmitt ................. B60T 8/3675
303/119.2

(Continued)

FOREIGN PATENT DOCUMENTS

EP  2 640 617 A1  9/2013
JP  S62-54472     3/1987
(Continued)

OTHER PUBLICATIONS

Japanese Office Action dated Oct. 1, 2019 in Japanese Application No. 2016-049376.

*Primary Examiner* — Thomas J Williams
*Assistant Examiner* — James K Hsiao
(74) *Attorney, Agent, or Firm* — Foley & Lardner LLP

(57) ABSTRACT

An electronic control device is provided with a hydraulic control block made of an aluminum alloy, a synthetic-resin component holder configured to hold electronic components such as a pressure sensor, and a printed board for controlling driving of hydraulic control apparatus via the component holder. Electrode terminals of the pressure sensor are connected to the printed board, a terminal configuration part of an electroconductive member, which is inserted into an insertion hole of a body wall of the component holder, is connected to a negative electrode wiring of the printed board, and the outer end edge of an elastic contact part of the electroconductive member is brought into elastic-contact with the hydraulic control block, to establish conduction therebetween. Hence, the electric potential difference (Continued)

between the pressure sensor and the hydraulic control block can be canceled, thus reducing an electrical noise of the pressure sensor.

9 Claims, 5 Drawing Sheets

(51) Int. Cl.
 *B60T 8/173* (2006.01)
 *B60T 8/176* (2006.01)

(56) References Cited

U.S. PATENT DOCUMENTS

| | | | | |
|---|---|---|---|---|
| 5,865,511 | A * | 2/1999 | Hinz | B60R 16/0239 303/119.2 |
| 6,059,381 | A * | 5/2000 | Bayer | B60T 8/368 303/116.4 |
| 6,079,798 | A * | 6/2000 | Hosoya | B60T 8/363 303/119.3 |
| 6,132,011 | A * | 10/2000 | Iwamura | B60T 8/368 303/116.4 |
| 6,241,489 | B1 * | 6/2001 | Lewin | B60T 8/368 417/410.1 |
| 6,260,582 | B1 * | 7/2001 | Trautmann | B60T 8/368 137/884 |
| 6,972,959 | B2 * | 12/2005 | Asai | H05K 7/20854 165/185 |
| 7,040,720 | B2 * | 5/2006 | Sanada | B60T 8/368 303/119.3 |
| 7,158,372 | B2 * | 1/2007 | Sanada | H05K 3/308 137/557 |
| 7,354,117 | B2 * | 4/2008 | Otsuka | B60T 8/368 303/116.4 |
| 2008/0060889 | A1 * | 3/2008 | Tsuruta | B60T 8/368 188/110 |
| 2009/0030571 | A1 * | 1/2009 | Takayanagi | F15B 13/0835 701/36 |
| 2014/0285942 | A1 * | 9/2014 | Nagashima | G05D 16/2013 361/178 |

FOREIGN PATENT DOCUMENTS

| | | |
|---|---|---|
| JP | 2008-062848 A | 3/2008 |
| JP | 2008-146920 A | 6/2008 |
| JP | 2011-136695 A | 7/2011 |
| JP | 2012-106519 A | 6/2012 |
| JP | 2014-038762 A | 2/2014 |
| JP | 2014-216312 A | 11/2014 |
| JP | 2015-223914 A | 12/2015 |

* cited by examiner

ELECTRONIC CONTROL DEVICE

TECHNICAL FIELD

The present invention relates to an electronic control device for controlling a controlled system such as an anti-lock brake system (ABS) for vehicles.

BACKGROUND ART

A conventional electronic control device for use in a controlled system, for example a vehicle anti-lock brake system (ABS), has been disclosed in the following Patent document 1.

The conventional electronic control device has a hydraulic control block installed on a vehicle body and made of an aluminum alloy material, a resin-made component holder mounted on the upper end of the hydraulic control block and configured to hold many electronic components, a printed board fixedly connected to the upper end of the component holder, and a cover member configured to cover the component holder and the printed board.

The conventional electronic control device is also configured to control electrically-powered apparatus, such as an electric motor, pressure-increasing valves and pressure-reducing valves, held in the hydraulic control block, through the use of a variety of electronic components of the printed board and the component holder in conjunction with a detection signal from a pressure sensor for detecting a hydraulic pressure in the hydraulic passage of the hydraulic control block, depending on the brake operation force of the vehicle.

CITATION LIST

Patent Literature

Patent document 1: Japanese patent provisional publication No. JP2012-106519 A

SUMMARY OF INVENTION

Technical Problem

By the way, regarding the pressure sensor for detecting a hydraulic pressure in the hydraulic passage of the hydraulic control block, for the purpose of improving the sensor accuracy, a sensor body, in which integrated circuits, condensers and the like are accommodated, is integrally held in the component holder. Additionally, a sensing element of the tip of the pressure sensor is provided to directly face into the hydraulic passage.

However, as discussed previously, the electrically-powered apparatus, such as the electric motor, the pressure-increasing valves and the pressure-reducing valves, are provided in the hydraulic control block. Thus, when an electrical noise of a specific frequency (for example, a frequency near 30 MHz), generated from the powered apparatus, is transmitted to the pressure sensor, there is a possibility (a risk) of a malfunction (an output fluctuation) of the pressure sensor.

It is, therefore, in view of the previously-described drawbacks of the prior art electronic control device, an object of the invention to provide an electronic control device capable of effectively reducing an electrical noise transmitted from the hydraulic control block to the pressure sensor.

Solution to Problem

The electronic control device of the invention is provided with a metal hydraulic control block in which hydraulic control apparatus (electrically-powered apparatus) are provided, an electronic control mechanism for driving the hydraulic control apparatus, a pressure sensor held in the electronic control mechanism and provided for detecting a hydraulic pressure in the hydraulic control block, a circuit board of the electronic control mechanism, to which terminals of the pressure sensor are connected, and an electroconductive member for conducting a negative electrode wire of the circuit board and the hydraulic control block.

Advantageous Effects of Invention

According to the invention, it is possible to suppress a malfunction of a pressure sensor, by reducing an electrical noise of a specific frequency, transmitted from the hydraulic control block to the pressure sensor.

BRIEF DESCRIPTION OF DRAWINGS

FIG. 5 illustrates an electroconductive member of the embodiment, FIG. 5A is a right side view, whereas

DESCRIPTION OF EMBODIMENTS

Embodiments in which an electronic control device of the present invention has been applied to a vehicle anti-lock brake system (ABS) are hereinafter described in detail with reference to the accompanying drawings.

First of all, the basic configuration of the ABS is hereunder explained. The ABS is basically provided with a master cylinder for generating a brake pressure according to a depression amount of a brake pedal (not shown), a main passage through which the master cylinder and each of front-right (FR) and front-left (FL) wheel cylinders of the front road wheel side and rear-left (RL) and rear-right (RR) wheel cylinders of the rear road wheel side are communicated with each other, normally-open pressure-increasing solenoid valves (described later) and normally-closed pressure-reducing solenoid valves (described later) disposed in the main passage for controlling a brake fluid pressure to each individual wheel cylinder from the master cylinder, a pump disposed in the main passage for discharging a brake fluid pressure (brake fluid) to each individual wheel cylinder, and a reservoir for storing brake fluid discharged from each individual wheel cylinder via the pressure-reducing valves and for supplying brake fluid to the main passage by operation of the pump.

The above-mentioned pressure-increasing valves are configured to control the brake fluid pressure to each individual wheel cylinder during normal brake operation such that the brake fluid pressure from the master cylinder can be supplied to the individual wheel cylinders. On the other hand, the above-mentioned pressure-reducing valves are configured to return the brake fluid back to the reservoir with the pressure-reducing valves opened when the internal pressure in each wheel cylinder becomes equal to or greater than a predetermined pressure value and thus a road wheel or road wheels begin to slip.

The brake fluid pressure in each individual wheel cylinder can be controlled in either a fluid-pressure increase, decrease, or hold mode by controlling opening and closing of each of the pressure-increasing valves and the pressure-reducing valves by means of the electronic control device.

Figure 2:
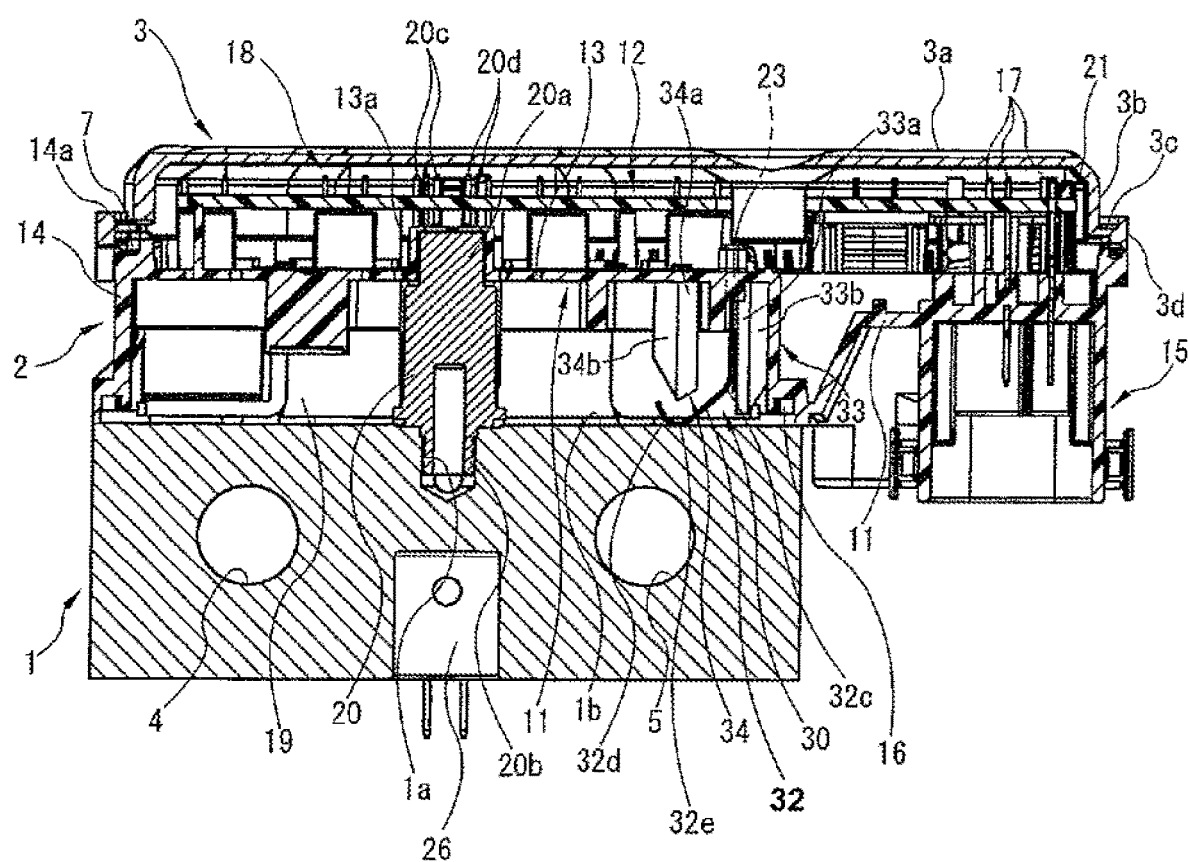
FIG. 2 is a longitudinal cross-sectional view of the electronic control device of the embodiment.
Figure 3:
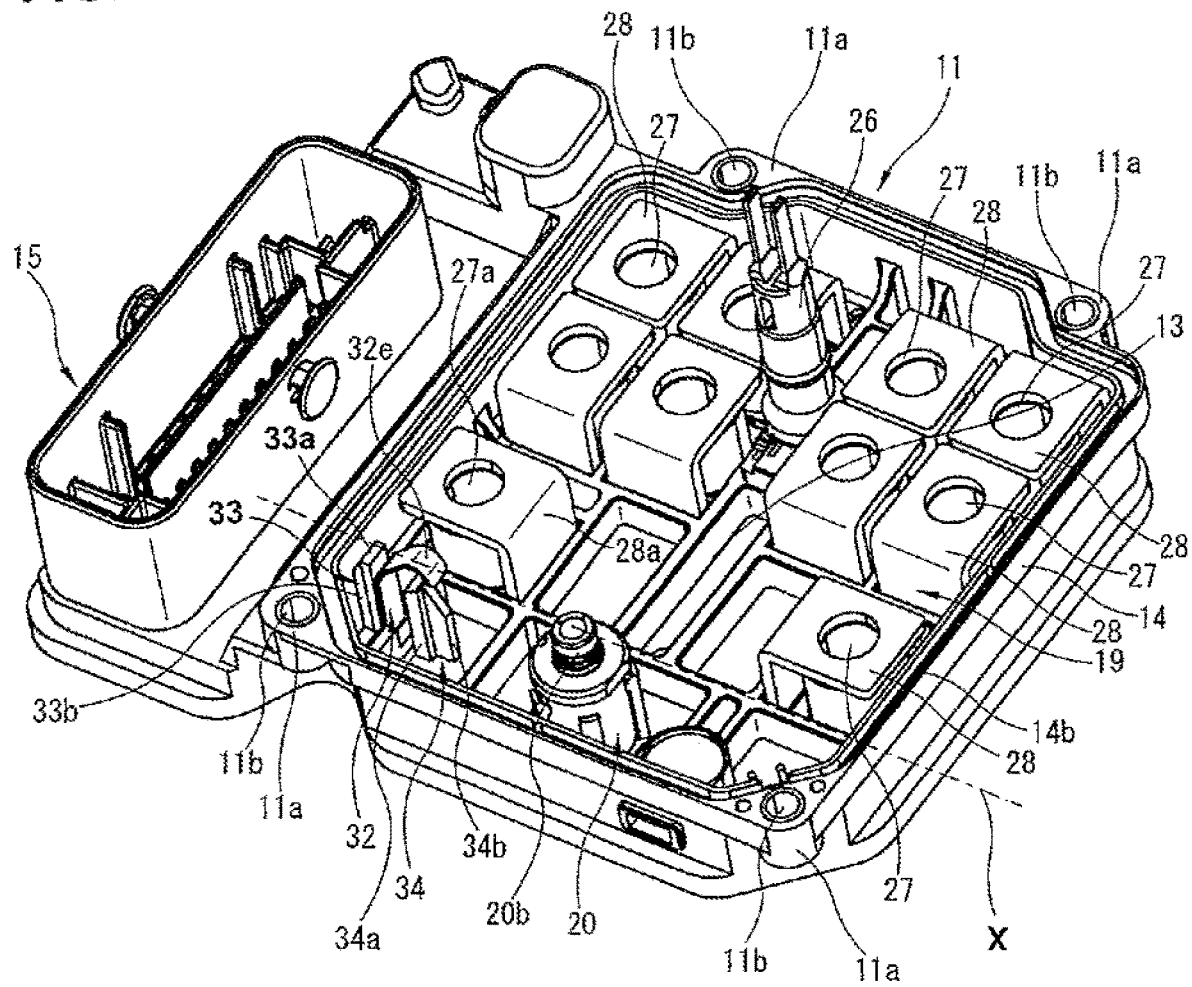
FIG. 3 is a perspective view illustrating a component holder of the embodiment.
Figure 4:
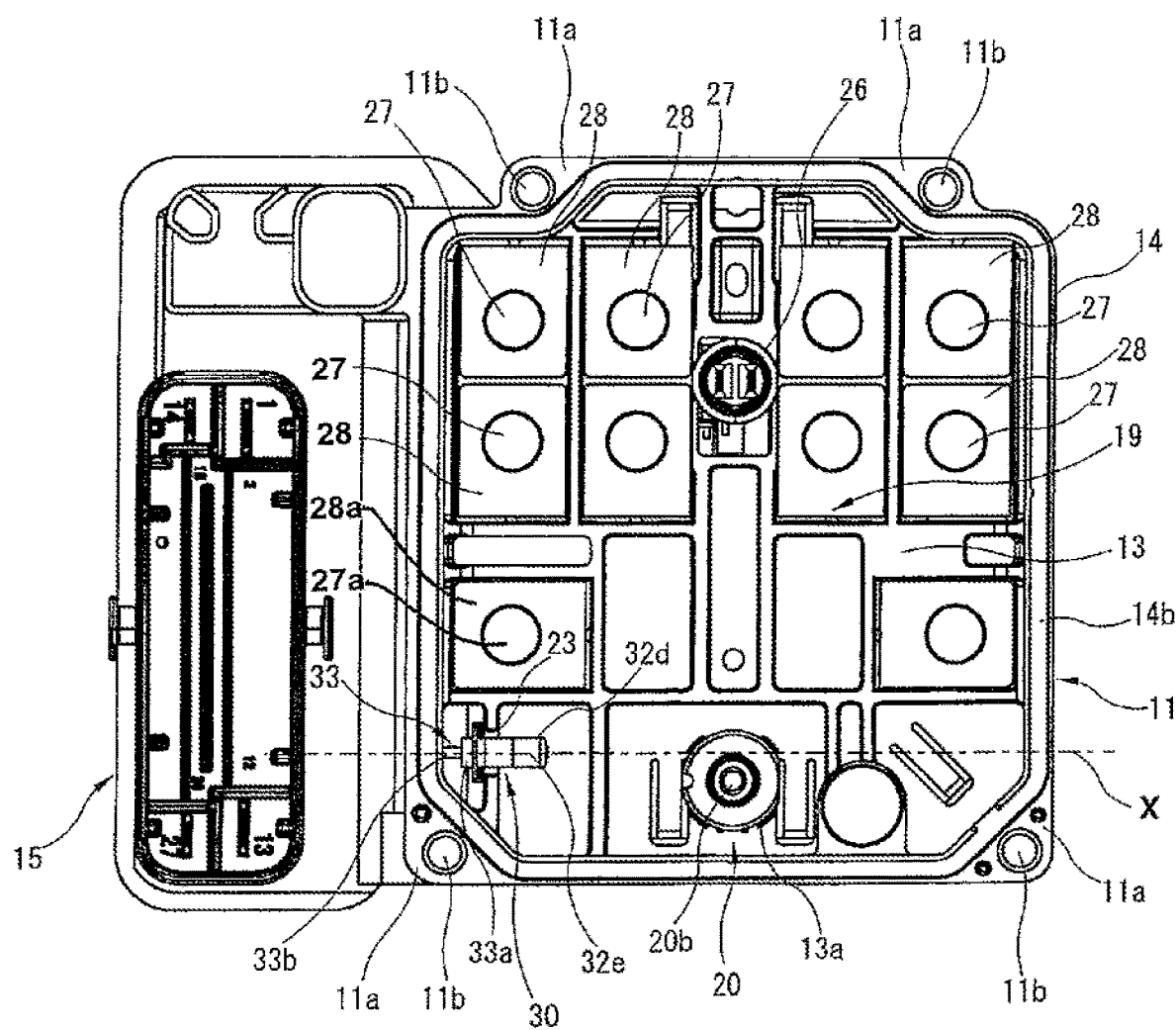
FIG. 4 is a bottom view of the component holder.

As shown in FIGS. 2-4, the electronic control device is provided with an electrically-conductive hydraulic control block 1 fixed to the vehicle body horizontally for example, an electronic control mechanism 2 mounted or assembled onto the upper end (viewing FIG. 2) of the hydraulic control block 1, and a cover member 3 fitted on the electronic control mechanism 2 from above.

The above-mentioned hydraulic control block 1 is made of an aluminum alloy material and integrally formed into a substantially cubic shape. Hydraulic control block 1 is formed with a plurality of holding or retaining holes 4, 5 into which the lower parts of the plurality of pressure-increasing valves and pressure-reducing valves (not shown), constructing part of the hydraulic control apparatus, are inserted and held.

Hydraulic control block 1 includes the main passage and a sub-passage formed in the hydraulic control block and configured to communicate with the pressure-increasing valves and the pressure-reducing valves. Further, the hydraulic control block includes the pump for supplying a brake fluid pressure into the main passage. Also provided at the hydraulic control block is an electric motor that drives the pump. Furthermore, hydraulic control block 1 has four female screw holes (not shown) formed in respective upper four corners of the hydraulic control block. Fixing bolts (not shown) for fixing a component holder 11 (described later) are screwed into the female screw holes, respectively.

As shown in FIG. 2, cover member 3 is made of a synthetic resin material and formed into a thin dish-shape corresponding to the outline of hydraulic control block 1. Cover member 3 is constituted of a flat upper wall 3a, a rectangular annular side wall (a rectangular annular peripheral wall) 3b formed integral with the outer peripheral edge of the upper wall 3a, and a flanged portion 3c continuously formed integral with the lower outer peripheral portion of the side wall 3b. By the way, this cover member 3 may be made of an aluminum alloy material.

The flanged portion 3c is provided with an annular engaging piece 3d, which is brought into engagement with the circumference of the upper end of the component holder 11 (described later) in a state where a printed board 12 (described later) is covered by the cover member 3.

The above-mentioned electronic control mechanism 2, which is located between the hydraulic control block 1 and the cover member 3, has the component holder 11 on which electromagnetic coils 27 for respectively operating (opening and closing) the pressure-increasing solenoid valves and the pressure-reducing solenoid valves are mounted, and the printed board 12 serving as a circuit board for controlling driving of the powered apparatus such as the electric motor, the printed board 12 being disposed on the component holder 11 in a manner so as to be superimposed on the component holder 11.

Component holder 11 is made of a synthetic resin material and formed into a block-plate shape. As shown in FIGS. 2-4, component holder 11 has a plate-like body wall 13 formed into a rectangular shape substantially corresponding to the outline of the hydraulic control block 1 and cover member 3, and a rectangular annular outer peripheral wall 14 formed integral with the body wall 13 in a manner so as to surround the entire circumference of the body wall 13.

A connector configuration part 15 is located outside of the body wall 13 (the outer peripheral wall 14) and formed integral with the body wall. The connector configuration part 15 is constituted of a power connector connected to a battery and a signal connector serving as a signal transmission route for various signals such as a signal from a resolver, signals transmitted through controller area network (CAN) communication, and input/output informational data signals transmitted through an I/O (an input/output port or interface).

The body wall 13 has a component housing chamber 19 defined inside thereof in such a manner that the component housing chamber is surrounded by the outer peripheral wall 14. A pressure sensor 20 (described later), a power-feeding terminal 26 for supplying electric power to the electric motor (not shown), a plurality of electromagnetic coils 27, and a plurality of yokes 28 configured to surround respective electromagnetic coils 27 are held (retained) and accommodated in the component housing chamber 19. Additionally, within the component housing chamber 19, a group of terminals 17 of component holder 11 and terminal pins (terminals) 18 of electromagnetic coils 27 and the like are provided to protrude toward the printed board 12 and electrically connected to corresponding terminal holes of the printed board 12 by soldering or the like.

On one hand, the outer peripheral wall 14 has an annular engagement groove 14a formed over the entire circumference of the upper end (viewing FIG. 2), facing toward a mounting side (viewing FIG. 2) of the printed board 12. The lower part of the engaging piece 3d of cover member 3 is brought into elastic-engagement with the annular engagement groove 14a via a seal member 7. On the other hand, as shown in FIGS. 2-4, the outer peripheral wall 14 has a rectangular annular fitting groove 14b formed over the entire circumference of the lower end, facing toward a side of the hydraulic control block 1. An annular seal 16 is fixed and fitted into the rectangular annular fitting groove 14b so as to provide a fluid-tight seal under elastic contact with the circumference of the upper face of the hydraulic control block 1.

Furthermore, as shown in FIGS. 3-4, component holder 11 has four boss portions 11a formed at four corners outside of the outer peripheral wall 14, respectively. Four bolt insertion holes 11b, into which the fixing bolts (not shown) are inserted, are vertically formed through the boss portions 11a through the use of respective metal sleeves.

Pressure sensor 20 is provided in the component housing chamber 19 of the body wall 13. The pressure sensor is configured to detect a hydraulic pressure in the brake fluid passage formed in the hydraulic control block 1. That is, as shown in FIG. 2, a cylindrical hollow portion 13a is formed at a predetermined position of the body wall 13 in a manner so as to protrude toward the printed board 12. The upper end of pressure sensor 20 is inserted and fixed into the cylindrical hollow portion 13a from a side of the component housing chamber 19.

The above-mentioned pressure sensor 20 is formed into a stepped cylindrical shape, and configured to accommodate therein electronic components such as condensers and integrated circuits. A middle-diameter portion 20a, corresponding to the upper part (viewing FIG. 2) of the pressure sensor, is inserted and disposed in the cylindrical hollow portion 13a. A small-diameter portion 20b, corresponding to the lower part (viewing FIG. 2) of the pressure sensor and serving as a sensing element, is configured to face into a brake fluid pressure passage (not shown) formed in the hydraulic control block 1 via a support hole 1a formed in the hydraulic control block 1.

Also, pressure sensor 20 has four terminals, namely, two positive terminals 20c and two negative terminals 20d, these positive and negative terminals being configured to protrude from the top end of the middle-diameter portion 20a and inserted into corresponding positive and negative terminal holes of the printed board 12, and then connected to the respective terminal holes by soldering. That is, the two positive terminals 20c of four terminals 20c, 20d are joined or connected to the positive terminal holes of the printed board 12, whereas the other two negative terminals 20d are connected to the negative terminal holes. Instead of fixedly connecting each of terminals 20c, 20d, these terminals may be configured to be displaceably arranged under elastic contact with the printed board. Concretely, power-distribution pads may be formed on the surface of the printed board 12, facing the pressure sensor 20, and shaped into a land (a terminal area). In this case, for the purpose of power-supply, the terminals 20c, 20d must be brought into elastic-contact with the positive terminal area of one of power-distribution pads and the negative terminal area of the other power-distribution pad, respectively.

As a means for fixing the printed board 12, a plurality of snap-fit joints (simply, snap-fits) 21 are provided to stand at given positions of the upper face of the outer periphery of the body wall 13. These snap-fits 21 are provided to regulate a predetermined width of gap between the component holder 11 and the printed board 12, and also configured to fix the outer peripheral portion of the printed board 12 to the component holder 11 by virtue of an elastic force. The axial length of each of the snap-fits is set to a length so as not to interfere with electronic components (described later) mounted on the upper face of the body wall 13 of the component holder 11 and the lower face of the printed board 12.

As shown in FIG. 2, the printed board 12 is a multilayer wiring board, which is made of a synthetic resin material and formed into a substantially square thin plate-shape. The printed board includes a microcomputer and the like. A plurality of electronic components that serve as control circuit elements for controlling power-supply to each of the electric motor and electromagnetic coils 27, a driver element, which is a drive circuit element for driving the electric motor and electromagnetic coils 27 and includes semiconductor switching elements (MOS-FETs) and a packaged power module, and sensors for detecting a vehicle acceleration, a vehicle pitching motion and a vehicle yaw rate are mounted on the printed board 12. Also formed in the internal wiring layer of the printed board is a wiring pattern (a distribution pattern) that constructs part of the control circuit. A drive signal for the electric motor and a drive signal for each of electromagnetic coils 27 are produced by means of the printed board 12.

Furthermore, the group of terminals of component holder 11 and the terminal pins of electromagnetic coils 27 are inserted into the plurality of terminal holes formed in the printed board 12 respectively, and then connected to the printed board by soldering.

Moreover, as shown in FIGS. 1-4, an electroconductive member 30 is provided between the hydraulic control block 1 and the printed board 12, in a manner so as to conduct the hydraulic control block 1 and the printed board 12, while penetrating an insertion hole 23 (described later) of the body wall 13 of component holder 11.

Figure 5B:
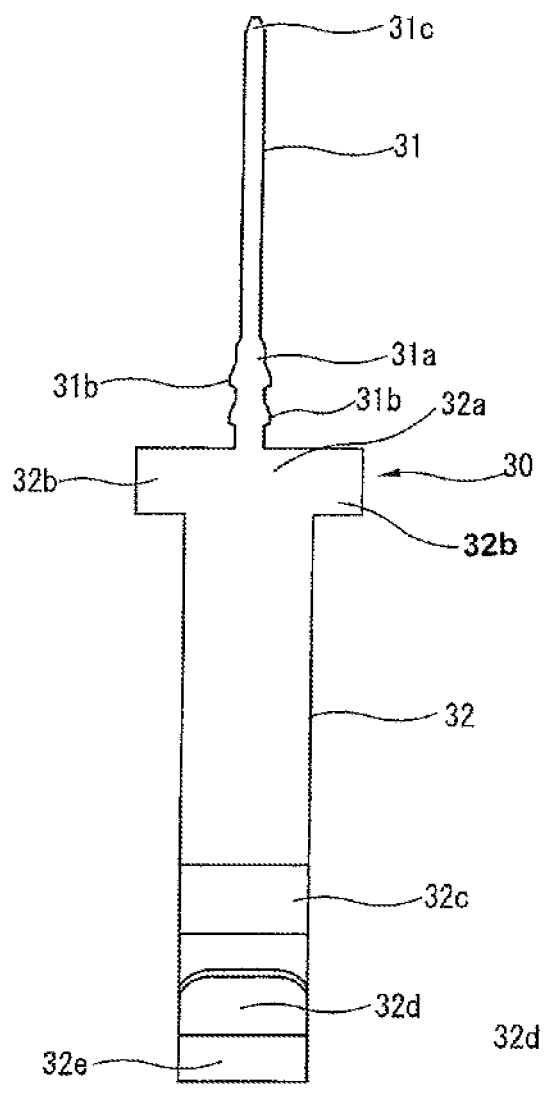
FIG. 5B is a front view.
Figure 5A:
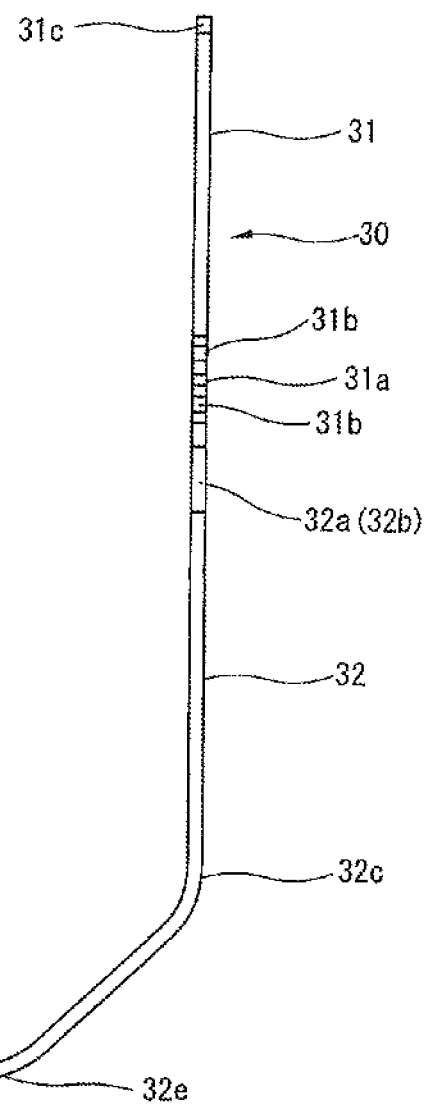

As shown in FIGS. 5A-5B, electroconductive member 30 is made of a copper material and formed into an elongated plate-shape. Electroconductive member 30 is constituted of a terminal configuration part 31 and an elastic contact part 32. The terminal configuration part 31 is one end portion (i.e., a narrow end), which extends straight and whose width is narrow. The elastic contact part 32 is the other end portion (i.e., a widened end), which extends downwards from the terminal configuration part 31 and whose bent tip is brought into elastic-contact with the upper face 1b of the hydraulic control block 1.

The above-mentioned terminal configuration part 31 has a root 31a configured as an elongated terminal and formed integral with the elastic contact part 32. The root 31a is formed on both side edges with a plurality of locking claws 31b brought into engagement with the hole edge of the insertion hole 23 when, as shown in FIG. 2, the root 31a has been inserted into the insertion hole 23 of the component holder 11 (described later). The tip (the distal end) 31c of the terminal configuration part 31 is configured to protrude upwards through the insertion hole 23 and then connected to a negative electrode wire of the printed board 12.

The above-mentioned elastic contact part 32 is, as a whole, formed and bent into a substantially J-shape. A central root 32a of the elastic contact part 32, which is formed integral with the root 31a of the terminal configuration part 31, is formed on both side edges with a pair of laterally-protruding pieces 32b, 32b. These laterally-protruding pieces 32b, 32b serve to restrict a maximum insertion amount by abutted-engagement with the hole edge of the insertion hole 23 when the terminal configuration part 31 has been inserted into the insertion hole 23. Furthermore, the elastic contact part 32 has an obtuse-angled first bent portion 32c and a circular-arc shaped second bent portion 32d, both formed at the lower end of the central root 32a. The first bent portion 32c is inwardly bent at an obtuse angle at a predetermined position of a straight portion of the lower end of the central root. The second bent portion 32d is bent in a manner so as to be folded back on the distal end side than the first bent portion 32c. An outer end edge 32e of the second bent portion 32d is brought into elastic-contact with the upper face 1b of the hydraulic control block 1 by an elastic force applied by the first bent portion 32c itself.

On the other hand, as shown in FIGS. 1-4, the previously-discussed component holder 11 has the insertion hole 23 formed as a through hole along a vertical direction near one boss portion 11a of the boss portions (one bolt insertion hole 11b of the bolt insertion holes) of the body wall 13 on a side of the connector configuration part 15. A side of the terminal configuration part 31 of electroconductive member 30 is inserted into the insertion hole 23. The cross-sectional shape of insertion hole 23 is formed as a similar figure having the same cross-sectional shape as the terminal configuration part 31, but the size of the cross-section of the insertion hole is dimensioned to be slightly greater than that of the terminal configuration part 31, such that the side of terminal configuration part 31 can be inserted into the insertion hole with a slight sliding resistance.

Hence, in a state where the terminal configuration part 31 has been inserted into the insertion hole 23, the electroconductive member 30 is interposed between the pressure sensor 20 and a portion of the outer peripheral wall 14, the portion of the outer peripheral wall being located between the pressure sensor 20 and the connector configuration part 15. Additionally, the electroconductive member 30 is held near the one boss portion 11a. That is to say, as shown in FIGS. 3 and 4, the electroconductive member 30 is arranged on a straight line "X" that connects the pressure sensor 20 and the connector configuration part 15. Additionally, the electroconductive member 30 is arranged near the one boss portion 11*a* of the boss portions 11*a*, which are fastened with respective fixing bolts. Furthermore, the electroconductive member 30 is arranged between one electromagnetic coil 27*a* of the electromagnetic coils (one yoke 28*a* of the yokes) and the outer peripheral wall 14.

Figure 1:
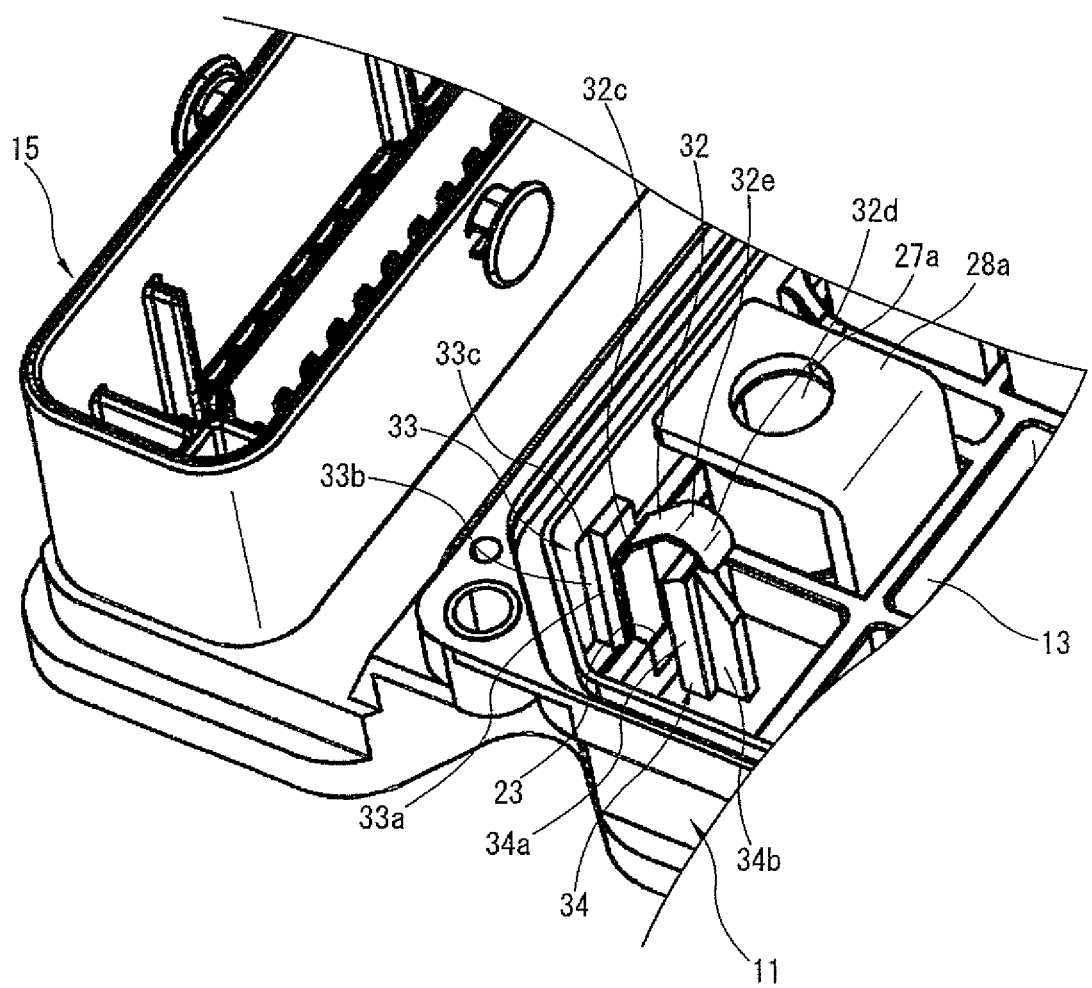
FIG. 1 is an enlarged perspective view illustrating an essential part of an electronic control device of an embodiment according to the present invention.

Moreover, as shown in FIG. 1, a guide part 33 and a stopper part 34 are both provided to stand near the hole edge of the insertion hole 23, facing the hydraulic control block 1, and formed integral with the body wall 13. The guide part 33 is provided to slidably guide the terminal configuration part 31 into the insertion hole 23, when inserting the terminal configuration part 31 of electroconductive member 30 into the insertion hole 23. The stopper part 34 is located at a position being opposite to the position of the guide part 33 with the insertion hole 23 (the electroconductive member 30) between the guide part and the stopper part, for restricting an excessive inward flexural deformation of the elastic contact part 32 of electroconductive member 30 greater than a predetermined flexural deformation. These standing (upright) parts, namely, the guide part 33 and the stopper part 34 are formed integral with the component holder 11, when injection-molding the component holder 11.

The above-mentioned guide part 33 is formed into a T shape in cross section. The guide part 33 is constituted of a guide piece 33*a* formed linearly along the backface of electroconductive member 30 and having a rectangular cross-section, and a reinforcing piece 33*b* formed integral with the backface of the guide piece 33*a*.

The guide piece 33*a* is formed into a substantially rectangular shape in cross section. The width dimension of the guide piece 33*a* is set to almost the same width dimension as the electroconductive member 30. The longitudinal length of the guide piece 33*a* from the fixed end to the tip is set to a length such that the tip of the guide piece is sufficiently close to the upper face 1*b* of the hydraulic control block 1. On the other hand, the reinforcing piece 33*b* is formed into a substantially rectangular plate shape in cross section. The reinforcing piece 33*b* is integrally formed in a direction perpendicular to the backface of the guide piece 33*a* along a substantially centerline of this backface. The longitudinal length of the reinforcing piece 33*b* is formed or dimensioned to be slightly shorter than that of the guide piece 33*a*. Also, a distal end face 33*c* of the reinforcing piece 33*b* is cut and formed into a tapered shape.

The above-mentioned stopper part 34 is formed into a T shape in cross section. The stopper part 34 is constituted of a stopper piece 34*a* configured to extend from the body wall 13 toward the elastic contact part 32 of electroconductive member 30 and having a rectangular cross-section, and a reinforcing piece 34*b* integrally formed in a direction perpendicular to the backface of the stopper piece 34*a* along a substantially centerline of this backface and formed into a substantially rectangular shape in cross section.

The width dimension of the stopper piece 34*a* is dimensioned or set to almost the same width dimension as the elastic contact part 32 of electroconductive member 30. The longitudinal length of the stopper piece 34*a* from the fixed end to the tip is set to a length such that the tip of the stopper piece is slightly spaced away from the elastic contact part 32 of electroconductive member 30.

On the other hand, the reinforcing piece 34*b* is formed into a substantially rectangular plate shape in cross section. The reinforcing piece 34*b* is integrally formed in a direction perpendicular to the backface of the stopper piece 34*a* along a substantially centerline of this backface. The longitudinal length of the reinforcing piece 34*b* is formed as almost the same length as the stopper piece 34*a*. Also, respective distal end faces of the stopper piece 34*a* and the reinforcing piece 34*b* in total are formed into a chevron tri-angular shape corresponding to the circular-arc shape of the second bent portion 32*d* of elastic contact part 32 of electroconductive member 30. That is, each of the distal end faces of the stopper piece 34*a* and the reinforcing piece 34*b* is formed or configured as a tapered surface.

[Assembling Procedure]

The assembling procedure of the electronic control device is hereunder described briefly. First of all, the pressure-increasing valves and the pressure-reducing valves, the pump, the electric motor, and the reservoir are assembled on the hydraulic control block 1 beforehand, so as to constitute a hydraulic unit. Also, the power-feeding terminal 26 for power-supply to the motor, the plurality of electromagnetic coils 27 (27*a*), the plurality of yokes 28 (28*a*), and the plurality of electrical/electronic components, are mounted on the component holder 11 beforehand. Additionally, the middle-diameter portion 20*a* of pressure sensor 20 is fixed and press-fitted into the cylindrical hollow portion 13*a* of the body wall 13 from below.

Furthermore, a variety of electronic components, such as the wiring pattern, the previously-discussed semiconductor switching elements and the like, are mounted on the printed board 12.

The terminal configuration part 31 of electroconductive member 30 is inserted and held into the insertion hole 23 of the body wall 13, while the terminal configuration part 31 is slidably guided along the front face (an inside surface) of the guide piece 33*a* of guide part 33.

Subsequently to the above, the printed board 12 is brought into abutted-engagement with the component holder 11, while the printed board 12 is positioned on the upside of the plurality of snap-fits 21. At the same time, the previously-discussed terminals, that is, the terminals 17, 18, the terminals 20*c*, 20*d* of pressure sensor 20, and the tip of the terminal configuration part 31 of electroconductive member 30 are inserted into respective terminal holes of the printed board 12, while positioning these terminals into the respective terminal holes.

Thereafter, by pushing the printed board 12 downwards against the elastic force of snap-fits 21, the outer peripheral portion of the printed board 12 is snap-fitted and engaged with the component holder 11 by virtue of an elastic restoring force of snap-fits 21, thus permitting the printed board 12 to be stably retained or fixed on the component holder 11.

Thereafter, under a state where the previously-discussed terminals, that is, the terminals 17, 18 of the component holder and electromagnetic coils 27, the terminals 20*c*, 20*d* of pressure sensor 20, and the tip of the terminal configuration part 31 of electroconductive member 30 has been inserted into the respective terminal holes, soldering is performed between these terminals and these terminal hole edges, for the purpose of electric connection to the printed board 12.

Next, an adhesive is applied to the outer periphery of cover member 3, and then the cover member 3 is fitted on the printed board 12 and component holder 11 from above, while engaging claws of the engaging piece 3*d* are brought into engagement with respective engaging holes of the outer peripheral wall 14 of component holder 11, utilizing an elastic deformation of the seal member 7. By virtue of movement of the engaging claws into engagement with respective lower hole edges of the engaging holes, the cover member can be easily assembled or installed onto the component holder 11.

Subsequently to the above, when mounting the component holder 11 in a temporarily stopped state (a temporarily assembled state), while positioning the component holder 11 on the upper face of the hydraulic control block 1 through the annular seal 16, the small-diameter portion 20b of pressure sensor 20 is inserted and disposed in the support hole 1a of hydraulic control block 1. Thereafter, fixing bolts (not shown) are inserted into the four bolt insertion holes 11b of component holder 11 from above, and then screwed into the respective female screw holes (not shown) of the hydraulic control block 1, so as to fasten them with the fixing bolts. In this manner, as shown in FIG. 2, the assembling work of the component parts has been completed.

At this time, regarding the electroconductive member 30, the second bent portion 32d of elastic contact part 32 is elastically deformed toward the body wall 13 with the first bent portion 32c as a fulcrum. Additionally, by virtue of the elastic reaction force, the outer end edge 32e of the the second bent portion 32d is brought into elastic-contact with the upper face 1b of hydraulic control block 1. Hereby, a negative polarity electrode of the printed board 12 and the hydraulic control block 1 are electrically connected to each other via the electroconductive member 30.

By the way, it will be understood that the electroconductive member 30 is not limited to an electroconductive member such that only the first bent portion 32c is elastically deformed. In lieu thereof, the elastic contact part 32 may be configured to be elastically deformed over the entire length of the elastic contact part 32 located on the side of the hydraulic control block 1 with respect to the body wall 13. Furthermore, a deflection degree of elastic deformation may be different at each part or each section of the elastic contact part 32. Alternatively, a deflection degree of elastic deformation may be uniform at each part or each section of the elastic contact part.

In this manner, in the shown embodiment, the negative electrode of the printed board 12 and the hydraulic control block 1 are electrically connected to each other via the electroconductive member 30. Hence, an electric potential of the hydraulic control block 1 and an electric potential of the pressure sensor 20 can be brought sufficiently close to each other, in other words, the electric potential difference between the hydraulic control block 1 and the pressure sensor 20 can be brought close to substantially zero. Therefore, it is possible to effectively reduce an electrical noise transmitted from the electrically-powered apparatus such as the electric motor via the hydraulic control block 1 to the pressure sensor 20.

In more detail, an electrical noise tends to be generated in the current line due to a magnetic field change arising from a change (switching) of a drive current of each of the electric motor and the solenoids of the pressure-increasing valves and the pressure-reducing valves, but the previously-discussed electroconductive member permits flow of such an electrical noise to a side of hydraulic control block 1, that is, to the vehicle body side. Hereby, it is possible to effectively reduce the electrical noise transmitted to the pressure sensor 20.

Accordingly, it is possible to suppress an output fluctuation of pressure sensor 20, that is, a malfunction of the pressure sensor from occurring. This ensures stable brake fluid pressure control.

Additionally, the electroconductive member 30 is interposed between the pressure sensor 20 and the connector configuration part 15. Thus, the distance between the electroconductive member 30 and the connector configuration part 15 can be shortened. Hereby, it is possible to shorten the wiring pattern of the printed board 12. Hence, even when an electric potential of the negative electrode wiring of the printed board 12 has been varied via the pressure sensor 20, the electric potential difference relative to the hydraulic control block 1 can be rapidly brought close to substantially zero, and thus it is possible to take a stable resonant balance.

In particular, the electroconductive member 30 is arranged on a straight line "X" that connects the pressure sensor 20 and the connector configuration part 15. Thus, the wiring length from the pressure sensor 20 to the electroconductive member 30 can be shortened as much as possible. Hence, even when an electric potential of the negative electrode wiring of the printed board 12 has been varied via the pressure sensor 20, the electric potential difference relative to the hydraulic control block 1 can be more rapidly brought close to substantially zero.

Additionally, an electrical noise, which has been generated in the printed board 12, can be transmitted through the electroconductive member 30 directly to the hydraulic control block 1. This also contributes to an effective reduction in the electrical noise generated in the printed board 12.

Additionally, the electroconductive member 30 is arranged near a position at which the hydraulic control block 1 and the component holder 11 are fastened together with the fixing bolt. Hence, it is less likely to be affected by vibrations from the vehicle, thereby suppressing resonance of the electroconductive member 30, and thus ensuring good electrical conductivity by virtue of stable contact with the hydraulic control block 1.

Furthermore, the elastic contact part 32 of electroconductive member 30 is brought into elastic-contact (abutted-engagement) with the upper face 1b of hydraulic control block 1, utilizing an elastic deformation of the first bent portion 32c. Hence, individual differences of electroconductive members 30 installed, such as individual lengths of electroconductive members, and each electroconductive-member's individual abutted-engagement (elastic-contact) conditions, can be absorbed. Additionally, by virtue of the elastic contact, vibrations from the vehicle can be absorbed. A stable and reliable abutted-engagement state of the electroconductive member can be obtained at all times. As a result of this, it is possible to obtain better electrical conductivity by virtue of more stable and reliable contact with the hydraulic control block 1.

Additionally, the body wall 13 is provided with the guide part 33 for slidably guiding the electroconductive member 30 into the insertion hole 23. This facilitates the insertion work of the electroconductive member 30 into the insertion hole 23.

Furthermore, when the elastic contact part 32 of electroconductive member 30 is brought into elastic-contact with the upper face 1b of hydraulic control block 1, and thus the first bent portion 32c is bent and deformed outwards by the reaction force, an excessive deformation of the first bent portion can be suppressed by abutment of the first bent portion with the front face of the guide piece 33a of guide part 33, thereby maintaining a linear attitude of the elastic contact part. Thus, it is possible to obtain stable support of the electroconductive member 30 and reliable abutted-engagement state of the electroconductive member 30 with the upper face 1b of hydraulic control block 1.

Additionally, the body wall 13 is provided with the stopper part 34. For instance, suppose that the component holder 11 is assembled on the hydraulic control block 1 as discussed previously, and then a great inward flexural deformation of the elastic contact part 32 of electroconductive member 30 occurs owing to an assembly error. In such a situation, the inner face of the second bent portion 32d of elastic contact part 32 abuts on the distal end of stopper part 34, thereby restricting a further deformation of the elastic contact part. Hence, it is possible to certainly suppress an excessive inward flexural deformation of the elastic contact part. In particular, the distal end of stopper part 34 is formed into a substantially tri-angular shape corresponding to the shape of the elastic contact part 32 (the bent portion) of electroconductive member 30, thus exerting a stable stopper function by means of the stopper part 34.

Additionally, the guide part 33 has the reinforcing piece 33b, and also the stopper part 34 has the reinforcing piece 34b. Hence, respective basal ends (respective fixed ends) of the guide part and the stopper part can be strongly united to the body wall 13. Also, the reinforced guide part having an enhanced strength can provide stable guiding action when guiding the electroconductive member 30 into the insertion hole 23, whereas the reinforced stopper part having an enhanced strength can provide stable stopper action during excessive deformation of elastic contact part 32.

Additionally, the electroconductive member 30 is simply inserted into the insertion hole 23, and then the terminal configuration part 31 is merely fixed to the printed board 12 by soldering. Hence, connection and fixation of the electroconductive member to the printed board 12 can be both performed simultaneously. This facilitates both the assembling work and the fixing work, as compared to a case where the fixation to the board is performed with the use of fixing bolts separately from the connection to the board.

Furthermore, in the shown embodiment, wiring patterns of a power electronic circuit and a filter electronic circuit are integrally modularized and constructed as the thin component holder 11 (the thin electronic control mechanism). Hence, it is possible to sufficiently reduce the vertical height of the electronic control device, and thus the entire device can be downsized and thinned, thus ensuring light-weight of the device.

It will be understood that the invention is not limited to the particular embodiments shown and described hereunder, but that various changes and modifications may be made without departing from the inventive concept of this invention. For instance, the electroconductive member 30 may be fixed or attached to the component holder 11 by another method in a manner so as to establish conduction between the printed board 12 and the hydraulic control block 1.

Additionally, for instance, the shape and configuration of the component holder 11 may be arbitrarily modified.

Furthermore, regarding application target devices to which the electronic control device can be applied, the device of the invention may be applied to other devices, such as a traction control device/system (TCS), a vehicle attitude control device or a vehicle dynamics control system (VDC), and a brake control device having a vehicle attitude control function, in addition to an anti-lock brake system (ABS).

The invention claimed is:

1. An electronic control device comprising:
a metal hydraulic control block in which hydraulic control apparatus are provided;
an electronic control mechanism for driving the hydraulic control apparatus;
a pressure sensor held in the electronic control mechanism and provided for detecting a hydraulic pressure in the hydraulic control block;
a circuit board of the electronic control mechanism, to which terminals of the pressure sensor are connected; and
an electroconductive member for conducting a negative electrode wire of the circuit board and the hydraulic control block,
wherein
the electronic control mechanism has a component holder made of a synthetic resin material and the circuit board connected to the component holder for controlling driving of the hydraulic control apparatus;
the component holder has a component housing chamber defined inside of an outer peripheral wall for accommodating and disposing a plurality of electronic components including the pressure sensor in the component housing chamber, and a connector configuration part located outside of the component housing chamber;
the circuit board is fixed on an opening end side of the component housing chamber of the component holder;
the electroconductive member is interposed between the pressure sensor and a portion of the outer peripheral wall, the portion of the outer peripheral wall being located between the pressure sensor and the connector configuration part;
a plurality of fastening portions are formed outside of the outer peripheral wall of the component housing chamber for fastening the component holder and the hydraulic control block together; and
the electroconductive member is arranged at a position closer to one fastening portion of the fastening portions than the pressure sensor, the one fastening portion being located on a side of the connector configuration part.

2. The electronic control device as recited in claim 1, wherein:
the electroconductive member is arranged on a straight line that connects the pressure sensor and the connector configuration part.

3. The electronic control device as recited in claim 1, wherein:
the electroconductive member includes a terminal configuration part connected to a negative electrode wiring of the circuit board and an elastic contact part extending from the terminal configuration part toward the hydraulic control block;
the elastic contact part has a first bent portion bent at an obtuse angle and a second bent portion bent into a circular-arc shape on a distal end side corresponding to a side of the hydraulic control block than the first bent portion; and
the second bent portion is brought into abutted-engagement with the hydraulic control block.

4. The electronic control device as recited in claim 1, wherein:
the electroconductive member is constituted of a terminal configuration part formed into a narrow elongated plate-shape and connected to a negative electrode wiring of the circuit board and an elastic contact part formed integral with the terminal configuration part and formed into a plate-shape wider than the terminal configuration part;
the terminal configuration part has a root formed integral with the elastic contact part, the root being formed with locking portions, which are brought into engagement with a hole edge of an insertion hole formed in the component holder;

the terminal configuration part is configured to protrude through the insertion hole of the component holder toward the circuit board;

the elastic contact part is configured to protrude from a side of the component holder, facing the hydraulic control block; and the elastic contact part has a first bent portion which is bendingly deformable and a second bent portion which is brought into abutted-engagement with the hydraulic control block.

5. The electronic control device as recited in claim 4, wherein:

a stopper part is provided on a bottom wall of the component housing chamber of the component holder, for restricting an excessive inward deformation of the first bent portion in a state where an outer end edge of the second bent portion has been brought into abutted-engagement with the hydraulic control block.

6. The electronic control device as recited in claim 5, wherein:

the stopper part has a stopper piece formed into an elongated plate-shape having a rectangular cross-section and a reinforcing piece formed on a backface of the stopper piece, facing apart from the electroconductive member, the reinforcing piece of the stopper part being integrally formed along a longitudinal direction of the stopper part; and respective distal ends of the stopper piece and the reinforcing piece of the stopper part in total are cut and formed as an inclined surface of a triangular shape corresponding to a folded-back shape of the second bent portion.

7. The electronic control device as recited in claim 1, wherein:

an insertion hole for inserting and guiding the terminal configuration part of the electroconductive member toward the circuit board is formed through a bottom wall of the component housing chamber of the component holder; and a guide part is provided to protrude near a hole edge of the insertion hole of the bottom wall, for guiding the electroconductive member into the insertion hole.

8. The electronic control device as recited in claim 7, wherein:

the guide part is formed and dimensioned shorter than a length from the bottom wall to an outer end edge of an elastic contact part of the electroconductive member;

the guide part is configured to slidably guide a side surface of the electroconductive member through an inside surface of the guide part; and the guide part has a reinforcing piece formed on an outside surface of the guide part, facing the outer peripheral wall of the component housing chamber, the reinforcing piece of the guide part being integrally formed along a longitudinal direction of the guide part.

9. The electronic control device as recited in claim 7, wherein:

a stopper part is provided on the bottom wall of the component housing chamber of the component holder, for restricting an excessive inward deformation of the first bent portion in a state where the second bent portion has been brought into abutted-engagement with the hydraulic control block; and the stopper part and the guide part are formed so as to protrude parallel to each other from the bottom wall of the component holder.

* * * * *